United States Patent
Nelson et al.

(10) Patent No.: US 7,680,460 B2
(45) Date of Patent: Mar. 16, 2010

(54) WIRELESS PROCESS FIELD DEVICE DIAGNOSTICS

(75) Inventors: Richard L. Nelson, Chanhassen, MN (US); Philip G. Ostby, Cologne, MN (US); Gregory C. Brown, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 970 days.

(21) Appl. No.: 11/028,486

(22) Filed: Jan. 3, 2005

(65) Prior Publication Data

US 2006/0148410 A1 Jul. 6, 2006

(51) Int. Cl.
*H04B 17/00* (2006.01)
(52) U.S. Cl. .................... 455/67.11; 455/423; 455/572; 455/556.1
(58) Field of Classification Search .............. 455/67.11, 455/423, 90.3, 90.2, 414.1, 414.3, 420, 422.1, 455/41.3, 556.1, 572, 573; 370/254, 328, 370/401; 323/284, 299, 906
See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,557,621 A | 1/1971 | Ferran | 73/398 |
| 3,697,835 A | 10/1972 | Satori | 317/246 |
| 3,808,480 A | 4/1974 | Johnston | 317/256 |
| 3,924,219 A | 12/1975 | Braun | 338/34 |
| 4,008,619 A | 2/1977 | Alcaide et al. | 73/398 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,287,553 A | 9/1981 | Braunlich | 361/283 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |

(Continued)

FOREIGN PATENT DOCUMENTS

DE 3340834 A1 5/1985

(Continued)

OTHER PUBLICATIONS

Notification of Transmittal of the International Search Report and Written Opinion from EPO for PCT/US2005/044980 filed Dec. 13, 2005.

(Continued)

*Primary Examiner*—Tan Trinh
(74) *Attorney, Agent, or Firm*—Westman, Champlin & Kelly, P.A.

(57) ABSTRACT

A wireless process device for use in an industrial process control or monitoring system comprising includes a power source configured to power the process device. Diagnostic circuitry is configured to diagnose operation of process device and provides a diagnostic output. Wireless communication circuitry transmits information over a wireless communication link.

42 Claims, 4 Drawing Sheets

U.S. PATENT DOCUMENTS

| | | | |
|---|---|---|---|
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,475,047 A * | 10/1984 | Ebert, Jr. | 307/66 |
| 4,490,773 A | 12/1984 | Moffatt | 361/283 |
| 4,542,436 A | 9/1985 | Carusillo | 361/283 |
| 4,562,742 A | 1/1986 | Bell | 73/718 |
| 4,590,466 A | 5/1986 | Wiklund et al. | 340/870.28 |
| 4,670,733 A | 6/1987 | Bell | 338/36 |
| 4,704,607 A | 11/1987 | Teather et al. | 340/825.07 |
| 4,749,993 A | 6/1988 | Szabo et al. | 340/870.31 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,982,412 A * | 1/1991 | Gross | 377/6 |
| 5,025,202 A * | 6/1991 | Ishii et al. | 320/101 |
| 5,094,109 A | 3/1992 | Dean et al. | 73/718 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,329,818 A | 7/1994 | Frick et al. | 73/708 |
| 5,492,016 A | 2/1996 | Pinto et al. | 73/724 |
| 5,542,300 A | 8/1996 | Lee | 73/724 |
| 5,606,513 A | 2/1997 | Louwagie et al. | 702/138 |
| 5,610,552 A | 3/1997 | Schlesinger et al. | 327/560 |
| 5,637,802 A | 6/1997 | Frick et al. | 73/724 |
| 5,642,301 A | 6/1997 | Warrior et al. | 364/571.02 |
| 5,656,782 A | 8/1997 | Powell, II et al. | 73/756 |
| 5,665,899 A | 9/1997 | Willcox | 731/1.63 |
| 5,682,476 A | 10/1997 | Tapperson et al. | 395/200.05 |
| 5,705,978 A | 1/1998 | Frick et al. | 340/511 |
| 5,757,608 A | 5/1998 | Bernot et al. | 361/283.4 |
| 5,793,963 A | 8/1998 | Tapperson et al. | 395/200.31 |
| 5,851,083 A | 12/1998 | Palan | 403/337 |
| 5,870,695 A | 2/1999 | Brown et al. | 702/138 |
| 5,872,494 A | 2/1999 | Palan et al. | 333/252 |
| 5,899,962 A | 5/1999 | Louwagie et al. | 702/138 |
| 5,911,162 A | 6/1999 | Denner | 73/718 |
| 5,954,526 A | 9/1999 | Smith | 439/136 |
| 5,992,240 A | 11/1999 | Tsuruoka et al. | 73/718 |
| 6,038,927 A | 3/2000 | Karas | 73/706 |
| 6,236,096 B1 | 5/2001 | Chang et al. | 257/419 |
| 6,295,875 B1 | 10/2001 | Frick et al. | 73/718 |
| 6,338,283 B1 | 1/2002 | Blazquez Navarro | 73/865.8 |
| 6,508,131 B2 | 1/2003 | Frick | 73/756 |
| 6,711,446 B2 | 3/2004 | Kirkpatrick et al. | 700/19 |
| 6,774,814 B2 * | 8/2004 | Hilleary | 340/870.07 |
| 6,839,546 B2 | 1/2005 | Hedtke | 455/67.11 |
| 6,891,838 B1 * | 5/2005 | Petite et al. | 370/401 |
| 6,907,383 B2 * | 6/2005 | Eryurek et al. | 702/183 |
| 7,010,294 B1 * | 3/2006 | Pyotsia et al. | 455/420 |
| 7,058,542 B2 * | 6/2006 | Hauhia et al. | 702/183 |
| 7,233,745 B2 | 6/2007 | Loechner | 398/128 |
| 7,262,693 B2 * | 8/2007 | Karschnia et al. | 340/508 |
| 7,271,679 B2 | 9/2007 | Lundberg et al. | 333/24 |
| 2001/0025349 A1 | 9/2001 | Sharood et al. | 713/340 |
| 2002/0029130 A1 * | 3/2002 | Eryurek et al. | 702/183 |
| 2002/0065631 A1 * | 5/2002 | Loechner | 702/188 |
| 2002/0163323 A1 * | 11/2002 | Kasai et al. | 323/284 |
| 2003/0171827 A1 * | 9/2003 | Keyes et al. | 700/19 |
| 2003/0204371 A1 * | 10/2003 | Sciamanna | 702/183 |
| 2004/0086021 A1 * | 5/2004 | Litwin | 374/120 |
| 2004/0203434 A1 * | 10/2004 | Karschnia et al. | 455/67.11 |
| 2004/0211456 A1 * | 10/2004 | Brown et al. | 136/243 |
| 2004/0259533 A1 * | 12/2004 | Nixon et al. | 455/414.1 |
| 2005/0072239 A1 * | 4/2005 | Longsdorf et al. | 73/649 |
| 2005/0164684 A1 * | 7/2005 | Chen et al. | 455/414.1 |
| 2005/0201349 A1 | 9/2005 | Budampati | 370/342 |
| 2005/0245291 A1 | 11/2005 | Brown et al. | 455/572 |
| 2005/0276233 A1 * | 12/2005 | Shepard et al. | 370/254 |
| 2005/0281215 A1 | 12/2005 | Budampati et al. | 370/328 |
| 2006/0002368 A1 | 1/2006 | Budampati et al. | 370/351 |
| 2006/0036404 A1 * | 2/2006 | Wiklund et al. | 702/183 |
| 2006/0092039 A1 * | 5/2006 | Saito et al. | 340/825.37 |
| 2006/0181406 A1 * | 8/2006 | Petite et al. | 340/521 |
| 2006/0227729 A1 | 10/2006 | Budampati et al. | 370/278 |
| 2006/0274644 A1 | 12/2006 | Budampati et al. | 370/216 |
| 2006/0274671 A1 | 12/2006 | Budampati et al. | 370/254 |
| 2006/0287001 A1 | 12/2006 | Budampati et al. | 455/552.1 |
| 2007/0030816 A1 | 2/2007 | Kolavennu | 370/252 |
| 2007/0030832 A1 | 2/2007 | Gonia et al. | 370/338 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0280144 A1 | 12/2007 | Hodson et al. | 370/312 |
| 2007/0280178 A1 | 12/2007 | Hodson et al. | 370/338 |
| 2007/0280286 A1 | 12/2007 | Hodson et al. | 370/466 |
| 2007/0280287 A1 | 12/2007 | Samundrala et al. | 370/466 |
| 2007/0282463 A1 | 12/2007 | Hodson et al. | 700/20 |
| 2007/0288204 A1 | 12/2007 | Gienke et al. | 702/188 |
| 2009/0096413 A1 * | 4/2009 | Partovi et al. | 320/108 |

FOREIGN PATENT DOCUMENTS

| | | |
|---|---|---|
| DE | 101 04 582 A1 | 10/2001 |
| EP | 0 524 550 A1 | 1/1993 |
| EP | 1 202 145 | 5/2002 |
| JP | 8-17477 | 1/1996 |
| JP | 2002-142244 | 5/2002 |
| JP | 2002-270878 | 9/2002 |
| JP | 2003051894 | 2/2003 |
| JP | 2003134261 | 5/2003 |
| JP | 2004021877 | 1/2004 |
| WO | WO 99/53286 | 10/1999 |
| WO | WO 03/023536 | 3/2003 |
| WO | WO 2004/094892 | 11/2004 |
| WO | WO 2005/060482 | 7/2005 |

OTHER PUBLICATIONS

International Search Report and Written Opinion From EPO for PCT/US2005/015848.

Notification of Transmittal of the International Search Report or the Declaration- PCT/US03/10403, 2003.

"Wireless R&D Aims to Boost Traffic", by M. Moore, *InTech with Industrial Computing*, Feb. 2002, 3 pgs.

"System Checks Faraway Machines' Health", by J. Strothman, *InTech with Industrial Computing*, Feb. 2002, 1 pg.

"Wireless Management Toolkit XYR 5000", by Honeywell International Inc., Phoenix, Arizona, 3 pgs., Oct. 2003.

"Wireless Analog Input Transmitters XYR 5000", by Honeywell International Inc., Phoenix, Arizona, 4 pgs., Oct. 2003.

"Quad Analog Output Module Installation and User's Manual", by Honeywell International Inc., Phoenix, Arizona, pp. Ii, iii, iv and 1-12, Dec. 2003.

"Wireless Dual Analog Input Interface Transmitter Installation and User's Manual", by Honeywell International Inc., Phoenix, Arizona, pp. Ii-vi and 7-43, Dec. 2003.

"XYR 5000 Wireless Dual Analog Input Interface, Model Selection Guide", by Honeywell International Inc., Phoenix, Arizona, Dec. 2003.

"Wireless Measure, Monitor & Control", by Accutech, 4 pgs. May 2003.

"Wireless Instrumentation, Multi-Input Field Unit", by Accutech, 2 pgs., Dec. 2003.

"Quad Analog Output Module", by Accutech, 1 pg. Dec. 2003.

3 Pages from Website www.chemicalprocessing.com, Apr. 2004.

4 Pages from Website http://content.honeywell.com/imc/eznews/eznews0403/news.htm, 2004.

Office Action from European Patent Office in related Application No. 05853808.3-1249, Jun. 11, 2007.

Office Action from Russian Patent Office in related Application No. 2006145434, May 5, 2005.

Office Action from Chinese Patent Office in related Application No. 200580047035.

Office Action from Russian Patent Office in related Application No. 2007129725/09(032372); filed Aug. 2, 2007; 6 pages, including translated pages.

Office Action from Chinese Patent Office in related Application No. 2005800457035; 2 pages.

Third Office Action from Chinese Patent Office in related Application No. 2005800457035; 16 pages.

\* cited by examiner

WIRELESS PROCESS FIELD DEVICE DIAGNOSTICS

BACKGROUND OF THE INVENTION

The present invention relates to industrial process control or monitoring systems. More specifically, the present invention relates to wireless process field devices used in such systems.

In industrial settings, control systems are used to monitor and control inventories of industrial and chemical processes, and the like. Typically, the control system that performs these functions uses field devices distributed at key locations in the industrial process and coupled to control circuitry in the control room by a process control loop. The term "field device" refers to any device that performs a function in a distributed control or process monitoring system, including all devices used in the measurement, control and monitoring of industrial processes.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process controller, other field devices, or other circuitry, over the process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by responding to the magnitude of the current through the loop. In addition to, or in the alternative, the process control loop can carry digital signals used for communication with field devices. Digital communication allows a much larger degree of communication than analog communication. Field devices that communicate digitally can respond to and communicate selectively with the control room and/or other field devices. Further, such devices can provide additional signaling such as diagnostics and/or alarms.

In some installations, wireless technologies have begun to be used to communicate with field devices. Wireless operation simplifies field device wiring and setup. Wireless installations are currently used in which the field device includes a local power source. For example an internal battery (potentially charged by a solar cell) or other technique to obtain power without any wired connection. However, the various components and systems which are used to make a field device "wireless" are also susceptible to degradation and failure. This can introduce errors in measurements or control of an industrial process and can even lead to complete failure of a process device.

SUMMARY OF THE INVENTION

A wireless process variable transmitter for use in an industrial process control or monitoring system includes a process variable sensor configured to sense a process variable of the industrial process. A power source is configured to power the process variable transmitter. Diagnostic circuitry diagnoses operation of the process variable transmitter and provides a diagnostic output. Wireless communication circuitry transmits information related to the sensed process variable and related to the diagnostic output over a wireless communication link.

DETAILED DESCRIPTION

The present invention includes diagnostics for a wireless field device of the type which is designed to wirelessly communicate with a remote location such as a control room, hand held device or the like. As discussed in the Background Section it is often useful to couple sensor measurements and self-powered wireless communication techniques together to eliminate needs for long wire runs and process installations. One known method for providing local power for the combination of a sensor and wireless communication device is to use a solar panel to convert sunlight into power. Typically, a battery is also used with the system to provide power storage so that the unit can operate while sunlight is not present. Other techniques can also be used to power the device without requiring a wired connection.

Field devices are typically mounted in a remote location. The present invention includes the recognition that it is desirable to provide diagnostic capabilities directed to the wireless features of the field device, and to other aspects of the field device. This allows the cause of potential failures to be detected. Further, in some configurations, the diagnostic capabilities are used to assist in the mounting and configuration of the field device during installation. If a failure is detected, the diagnostic capabilities of the device can be used to report a probable cause or source of the failure. The diagnostic information can also be used to compensate for the failure.

Figure 1:
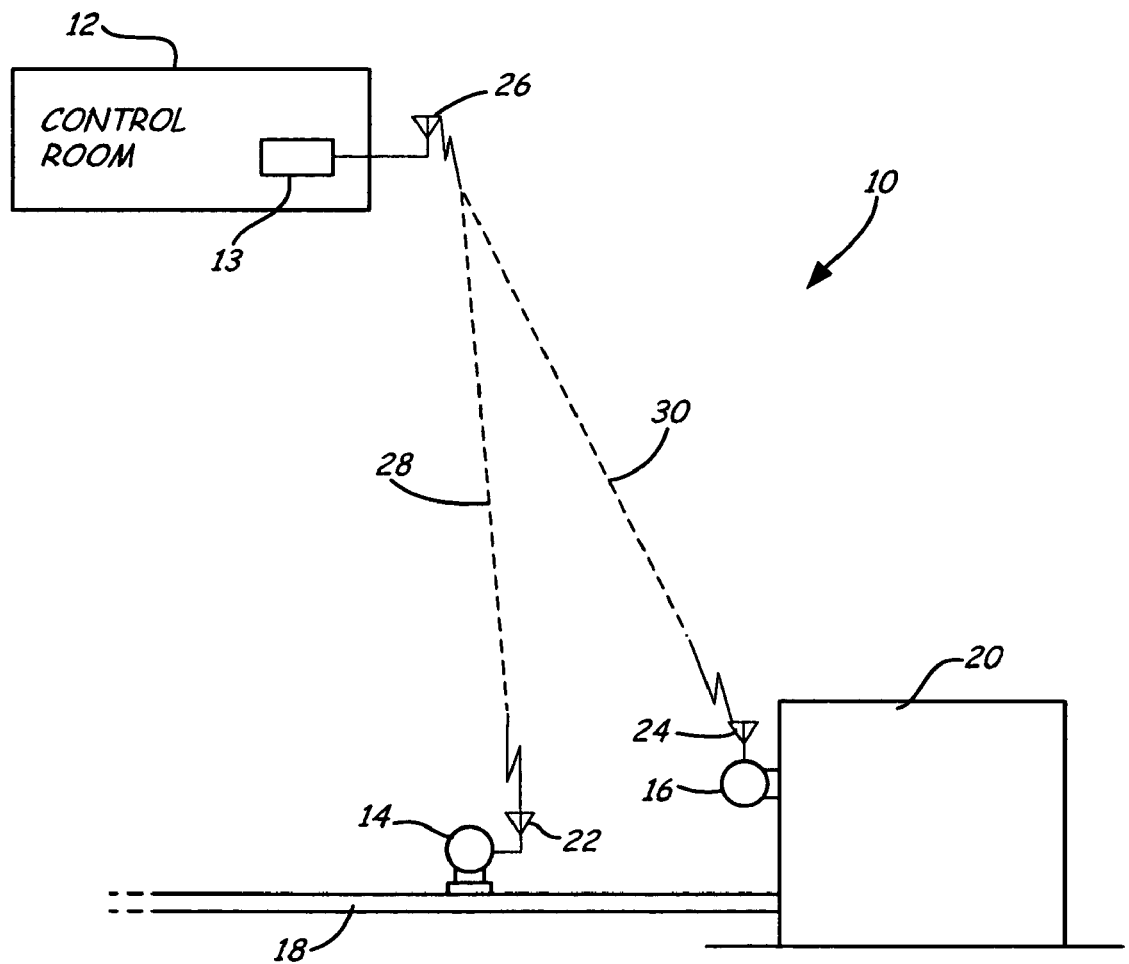
FIG. 1 is a simplified block diagram showing a process control or monitoring system for use with the present invention.

FIG. 1 is a simplified diagram showing an example process control or monitoring system 10 which includes a control room or control system 12 coupling to field devices 14 and 16. Field device 14 is shown coupled to process piping 18 and field device 16 is shown coupled to storage tank 20. Devices 14 and 16 include antennas 22 and 24, respectively, for transmitting and/or receiving information from antenna 26 associated with process control circuitry 13 of process control room 12. Devices 14 and 16 communicate using wireless radio frequency (RF) communication links 28 and 32 with circuitry 13 in control room 12. Field devices 14 and 16 include components to provide local power to the devices without requiring running additional wires. For example, device 14 and 16 can include solar cells and/or batteries for local power as illustrated below in greater detail.

These additional components which are used to eliminate the needs for wires to devices 14 and 16 can be a source of potential failure. The present invention provides a technique to provide diagnostic capability in field devices that use wireless communication techniques and a self-contained power source. For example, a field device can include one or more sensors for measuring a process variable and be coupled to a solar panel/storage battery power source. The device communicates over a wireless communication link including, for example, to a cell phone and/or GPRS (General Packet Radio System). In one specific example, the field device can include a supervisory digital control capability that can be used to manage the power by causing the wireless communication circuitry (and the process variable generator) to enter a sleep mode when not active. The same circuitry can be used to execute algorithms for use in diagnosing components of the device, including the components used to provide the wireless capabilities of the device.

Figure 2:
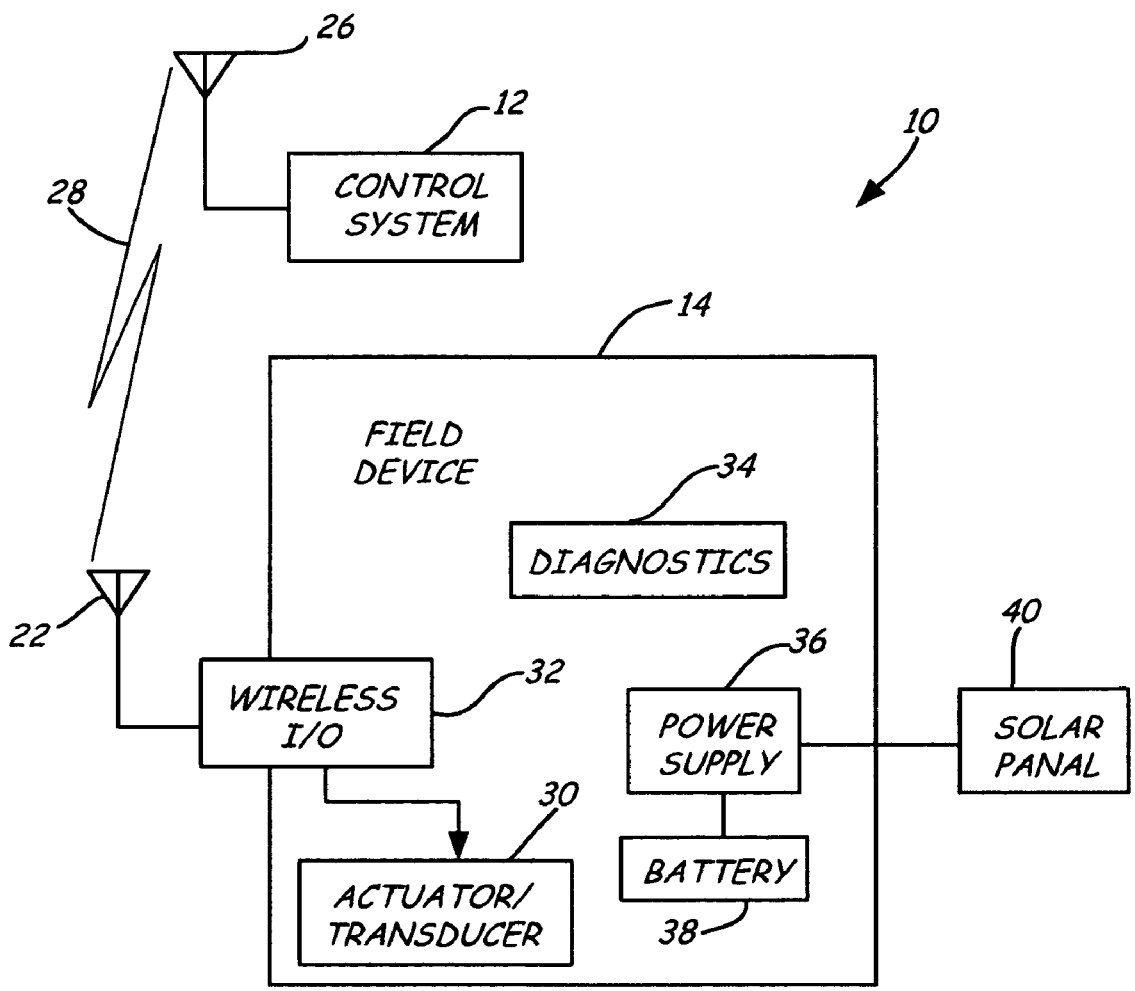
FIG. 2 is a block diagram showing components in a field device of the present invention.

FIG. 2 is a simplified block diagram showing field device 14 shown in FIG. 1 in greater detail. Field device 14 includes an actuator or transducer 30, wireless input/output (communication) circuitry 32, diagnostics 34, power supply circuit 36, battery 38 and solar panel 40. The actuator/transducer 30 can be either a sensor used to sense a process variable or an actuator, such as a valve, which is used to control a process. The wireless communication circuitry 32 couples to antenna 22 for communication with circuitry 13 (not shown in FIG. 2) of control system 12 over its antenna 26. Power supply circuit 36 is used to provide power to circuitry within field device 14. The power supply circuitry 36 can operate using power received from solar cell 40 or power received from battery 38. The power supply circuitry 36 can be powered from any type of power source that does not require wiring to a remote power source. The power supply circuitry 36 can be self contained within the field device 14 or, in some embodiments be located externally to the field device and positioned proximate to the field device. For example, a solar powered unit can be used to power a transmitter or other field device over a two wire connection which is also used to carry information. In such a configuration, the power supply circuitry can also provide wireless communication to a remote location. Such configurations are shown and described in U.S. patent application Ser. No. 10/850,828, WIRELESS POWER AND COMMUNICATION UNIT FOR PROCESS FIELD DEVICES filed on May 21, 2004 which is hereby incorporated by reference in its entirety. If sufficient power is received from solar cell 40, power supply circuitry 36 can also be used to charge the battery 38. The block 34 labeled diagnostics is used to implement the diagnostic functions in accordance with the present invention as discussed below in more detail. This diagnostic function can be implemented in hardware components, software components, or a combination of components and, for simplicity, it is shown as a single block 34 in FIG. 2.

Figure 3:
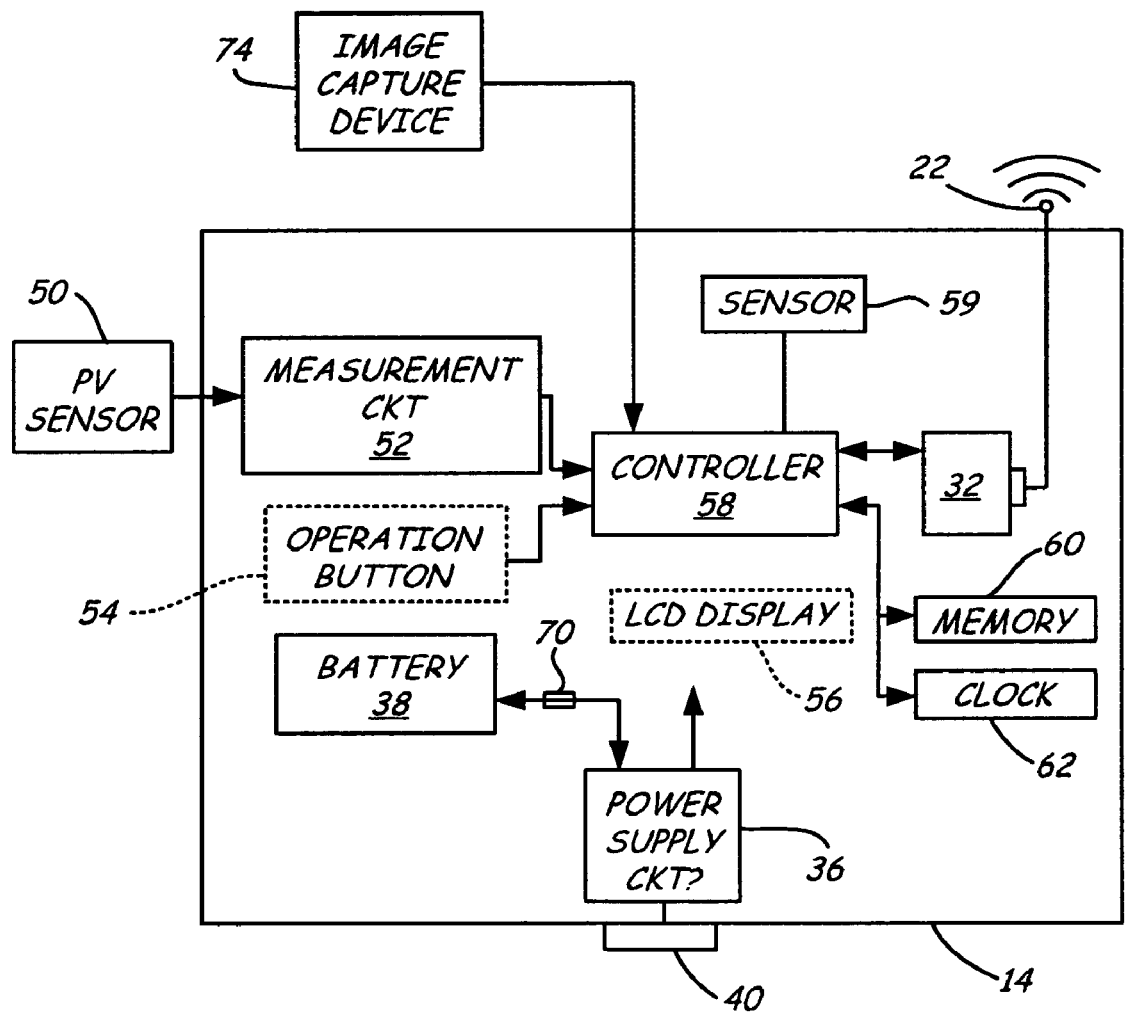
FIG. 3 is a more detailed block diagram showing components of the field device of FIG. 2.

FIG. 3 is a more detailed block diagram of process device 14 and shows a process variable sensor 50. The process variable sensor may be positioned within the housing of device 14 or external to the housing as illustrated in FIG. 3. Measurement circuitry 52 couples to process variables sensor 50 and is used to perform initial signal processing prior to providing a measurement signal to controller 58. An optional user input 54 is shown as operator button in FIG. 3. Similarly, an optional output device such as LCD display 56 is shown.

Controller 58 is typically a microprocessor based controller and couples to a memory 60 and a clock 62. The clock 62 determines the operational speed of digital circuitry within field device 14 and memory 60 is used to store information. Memory 60 can comprise both permanent and volatile memory and can be used to store data used during processing, programming instructions, calibration information, or other information, data or instructions for use with process device 14. In the configuration of FIG. 3, the diagnostic function 34 illustrated in FIG. 2 can be implemented, for example, within controller 58, and with optional additional circuitry as required.

Figure 4:
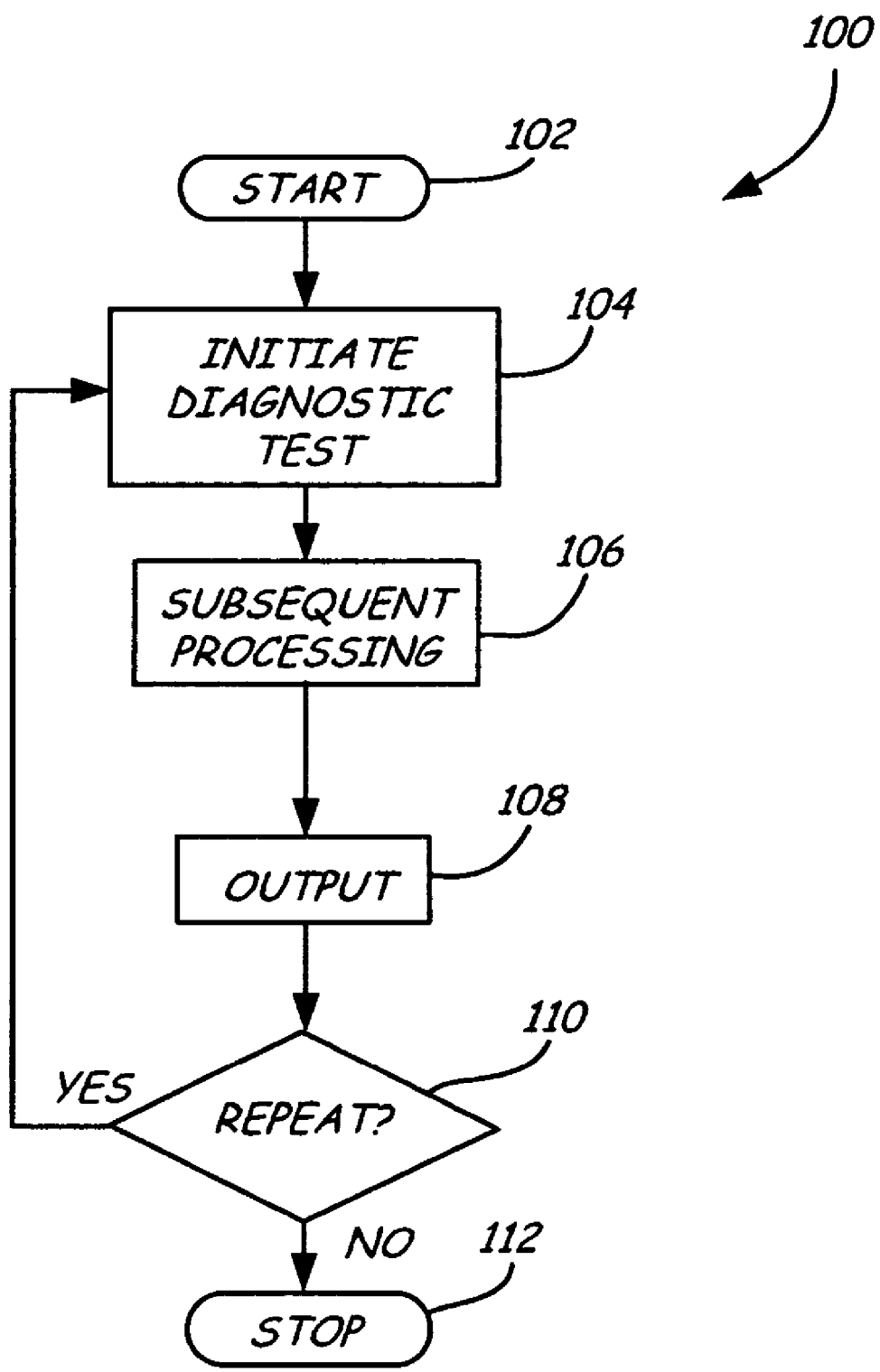
FIG. 4 is a block diagram showing example steps for implementing the present invention.

FIG. 4 is a simplified block diagram showing steps in accordance with the diagnostic algorithm of the present invention. FIG. 4 illustrates block diagram 100 which is initiated at start block 102. At block 104, the diagnostic test or algorithm is initiated as described below in more detail. Subsequent processing of the diagnostic result can be performed at block 106, as desired. An output, or other step, is performed at block 108 based upon the result of the diagnostic test. If desired, the diagnostic test can be repeated at block 110. For example, the diagnostic test can repeat at periodic or other desired intervals, or upon initiation from the detection of an event sensed in the process, or upon receipt of a command, or other cause to initiate diagnostics. The diagnostic processing optionally stops at block 112. The steps illustrated in FIG. 4 can be implemented, for example, by controller 58 based upon a program stored in memory 60.

The diagnostic test provided by block 104 can be any diagnostic related to the wireless functionality of device 14 including the wireless communication ability of device 14, the power supply capabilities of device 14 such as power supply circuit 36, solar cell 40 and/or battery 38. Further, in some configurations, the diagnostics are performed on any aspect of device 14 or of system 10.

In one example, an additional sensor 59 shown in FIG. 3 is used to provide diagnostic information. For example, a voltage sensor can be included in device 14 to sense the voltage output from solar cell 40. If the open circuit voltage of solar panel 40 over an extended period, for example 24 hours, is below a threshold voltage, the diagnostic test 104 can provide an output indicating that the solar panel 40 is blocked or broken. In another example, the maximum power output of the solar panel 40 is measured by sensor 59 and used to make a determination regarding the available solar energy. Sensor 59 can comprise temperature sensor coupled to solar panel 40 which is used to sense temperature of the panel 40 directly. The sensed temperature can be compared with the threshold to identify an over-temperature occurrence.

In another example configuration, the controller 58 uses sensor 59 to monitor a maximum or a total power output from the solar panel 40 over a period of time, such as a number of days. This actual power output can be compared to actual power usage of device 14 such that an output from controller 58 can be indicative that the installation can not support the power required by the operation of device 14. The data can also be used to determine the amount of available power remaining during normal operation or the amount of time to fully charge the battery 38. An output can be provided which indicates that the power budget criteria for the device is, or is not, being met. The time period required to fully charge the battery 38 can be measured and an alarm output provided if the required time period is greater than a desired threshold. Further, the controller 58 can provide an output reporting the percent equivalent sun hours (time period) per day for a particular installation, or provide an output indicating that a relatively small amount of power has been provided by solar panel 40 over a period of time, for example due to shading.

Additionally, using sensor 59, the diagnostic functionality can be configured to monitor voltage and/or current draw, for example, from battery 38 and/or solar panel 40 and report back information such as the average and peak power requirements of the device 14. Significant changes in daily power requirements can be reported or used to identify a fault condition. The rate of charge of the battery 38 can be used to diagnose operation, for example, if the battery 38 charges at a much slower rate or fails to reach full charge over a specified time or power level. An indication can be provided that the battery 38 may fail and should be replaced. The remaining battery life can be determined, for example, based upon the maximum discharge levels, temperature history and frequency, a decrease in charge rates, or using other criteria. Excessive battery temperatures can also be monitored.

The power supply circuitry 36 can also be monitored by sensor 39 to identify a failed or failing component. For example, if the charging circuit does not charge the battery, despite a dropping battery voltage, a failure can be indicated. Variations in voltage levels or signals can be used to indicate corroded terminals, a bad battery, or bad charging circuitry. Similarly, the charging circuitry or the power supply circuitry 36 can completely bypass the charging of battery 38 and provide all available power to circuitry within device 14.

In another example, a blocking device 70 is used to prevent the battery 38 from discharging back into the power supply circuitry 36. The blocking device 70, for example, can be contained within power supply circuitry 36 and can comprise a diode. However, if a diode is employed, a voltage drop of 0.7 volts occurs across the component. However, if a MOSFET transistor is employed rather than a diode or the like, the 0.7 volt drop will not be apparent and additional power will be available for charging of the battery 38 or for use with other circuitry.

In another example, the diagnostic test 104 is used during mounting and installation of the device 14. Such a mode can be entered, for example, using a remote RF transmitter, or by providing an input through input 54. For example, the signal strength received by the antenna 22 can be monitored such that the antenna can be oriented properly for maximum signal strength. A warning can be provided if the signal strength is insufficient for reliable operation. Similarly, the output from the solar panel 40 can be monitored and this information used in orienting the solar panel 40 relative to the sun for maximum efficiency. An output can be provided which indicates the condition of the battery so that an operator is ensured that a "good" battery is being used in the installation. Battery temperature can also be monitored using sensor 59. During installation, the diagnostic tests can verify for example, that the battery polarity, solar panel polarity, and charging circuitry are all functioning properly. In another example, test process variable values measured with the process variable sensor 50 and can be sent to the control room for verification. Other information such as operating parameters and functional test results can also be sent to the control room or other remote location. In another example, the span and zero settings of the process device 14 are sent over the wireless link both before and after calibrating the device 14. The after calibration values can be stored as a reference. The value of the last calibration can be transmitted, or displayed on the local display.

In another aspect, optical site diagnostics are used to verify conditions of the installation. For example, an image capture device 74, such as a digital camera or the like, can be used to capture images of the process device 14, or components of the device 14. This image information is used to verify the condition of the solar panel 40 and the mounting arrangement of the solar panel 40. For example, the image can indicate whether the solar panel 40 has become detached, broken or vandalized. Further still, this information can be used to provide a visual verification that the device 14 is being serviced or repaired by an operator, or a visual indication of weather indications.

The configuration and capabilities of the diagnostic functionality of the present invention provide a number of advantages for use with field devices having self contained power sources. These techniques provide a means of remotely assessing the condition and functionality of a process variable transmitter and self contained power generation unit. The installation and site conditions required for proper unit operation can be verified. Additional diagnostic capabilities can be added for subsequent operations. Information can be provided locally, for example to an installation technician, such that the technician is able to verify that the installation and site conditions will allow proper unit operation and the device can be adjusted accordingly. Image information can also be provided and used for diagnostics. For example, images can be transmitted over the wireless communication link for us in diagnosing or verifying device operation or condition.

Although the present invention has been described with reference to preferred embodiments, workers skilled in the art will recognize that changes may be made in form and detail without departing from the spirit and scope of the invention. The various circuits and algorithms and functionality can be implemented in hardware, software or their combination. Various components of the present invention can be implemented across a number of different components. For example, a particular diagnostic function may be implemented partially in a microprocessor and/or partially in other components such as measurement circuitry, memory, software, etc. Although a solar cell and battery have been described herein, the present invention is applicable to other components used for powering a wireless device. As used herein, "self contained power source" refers to apparatus to power the process device without requiring a physical connection to a remote power source. The diagnostics can be initiated automatically, or, upon receipt of a command of other event such as through input 54.

What is claimed is:

1. A wireless process variable transmitter for use in an industrial process control or monitoring system comprising:
   a process variable sensor configured to sense a process variable of the industrial process;
   a power source configured to power the process variable transmitter without a wired connection to an external source of power;
   diagnostic circuitry configured to diagnose operation of the power source of the process variable transmitter and having a diagnostic output indicative of an impending failure of the power source;
   wireless communication circuitry configured to transmit and receive information related to the sensed process variable and related to the diagnostic output over a wireless communication link; and
   wherein the power source includes a solar cell and wherein the diagnostic circuitry monitors a voltage output of the solar cell.

2. The apparatus of claim 1 wherein the power source includes a battery.

3. The apparatus of claim 2 wherein the diagnostic circuitry provides an output related to a time period required to charge the battery.

4. The apparatus of claim 2 wherein the diagnostic circuitry provides an output related to battery temperature.

5. The apparatus of claim 2 including a MOSFET which couples the battery to the circuitry configured to prevent discharge of the battery.

6. The apparatus of claim 1 wherein a diagnostic output is provided indicative of a faulty solar cell if the measured voltage is less than a predetermined threshold over a predetermined period.

7. The apparatus of claim 1 wherein a diagnostic output is provided based upon the sensed voltage indicative of insufficient sunlight for operation of the solar cell.

8. The apparatus of claim 1 wherein the diagnostic circuitry monitors cumulative energy output of the solar cell over a period.

9. The apparatus of claim 8 wherein the diagnostic output provides an output indicative of insufficient energy based upon the cumulative readings.

10. The apparatus of claim 1 wherein the diagnostic circuitry provides an output related to power requirements of the process variable transmitter.

11. The apparatus of claim 1 wherein the diagnostic circuitry monitors power requirements of components in the process variable transmitter.

12. The apparatus of claim 1 including a local operator interface configured to activate the diagnostic circuitry.

13. The apparatus of claim 1 including a display to provide an output from the diagnostic circuitry.

14. The apparatus of claim 1 wherein diagnostic circuitry is configured to provide an output related to position of an antenna of the wireless communication circuitry.

15. The apparatus of claim 1 wherein the diagnostic circuitry provides an output for use in orienting the solar panel.

16. The apparatus of claim 1 wherein the output is related to zero and span configuration of the process device.

17. The apparatus of claim 1 including an image capturing device.

18. The apparatus of claim 17 wherein the image capturing device is arranged to capture an image of a solar panel.

19. The apparatus of claim 17 wherein the image capturing device is configured to observe weather conditions.

20. The apparatus of claim 1 wherein the power source is contained within the wireless process variable transmitter.

21. The apparatus of claim 1 wherein the diagnostic circuitry includes a controller and software configured to diagnose operation of the process variable transmitter.

22. A method for diagnosing a wireless process transmitter coupled to an industrial process comprising:
powering the wireless process transmitter with a power source which includes a solar cell without a wired connection to an external source of power;
diagnosing operation of the power source of the wireless process transmitter by monitoring a voltage output of the solar cell, the diagnostics indicative of an impending failure of the power source; and
transmitting information related to a diagnoses of the power source of the wireless process transmitter over a wireless communication link.

23. The method of claim 22 wherein the power source includes a battery.

24. The method of claim 23 including providing an output related to a time period required to charge the battery.

25. The method of claim 23 including providing an output related to battery temperature.

26. The method of claim 22 wherein a diagnostic output is provided indicative of a faulty solar cell if the measured voltage is less than a predetermined threshold over a predetermined period.

27. The method of claim 22 wherein a diagnostic output is provided based upon the sensed voltage indicative of insufficient sunlight for operation of the solar cell.

28. The method of claim 22 including monitoring cumulative energy output of the solar cell over a period.

29. The method of claim 28 wherein the diagnosis is indicative of insufficient energy based upon the cumulative readings.

30. The method of claim 22 including providing an output related to power requirements of the process variable transmitter.

31. The method of claim 22 including monitoring power requirements of components in the process variable transmitter.

32. The method of claim 22 including providing a local operator interface.

33. The method of claim 22 including providing an output related to position of an antenna of the wireless process transmitter.

34. The method of claim 22 including providing an output for use in orienting the solar panel.

35. The method of claim 22 including providing an output is related to zero and span configuration of the process device.

36. The method of claim 22 including capturing an image with an image capturing device.

37. The method of claim 36 wherein the image capturing device is arranged to capture an image of a solar panel.

38. The method of claim 36 wherein the image capturing device is configured to observe weather conditions.

39. A wireless process variable transmitter for use in an industrial process control or monitoring system comprising:
a process variable sensor configured to sense a process variable of the industrial process;
a power source configured to power the process variable transmitter;
diagnostic circuitry configured to diagnose operation of the power source of the process variable transmitter and having a diagnostic output indicative of a condition of the power source;
wireless communication circuitry configured to transmit and receive information related to the sensed process variable and related to the diagnostic output over a wireless communication link;
wherein the power source includes a solar cell and wherein the diagnostic circuitry monitors a voltage output of the solar cell;
the power source includes a battery; and
the diagnostic circuitry provides an output related to a time period required to charge the battery.

40. A wireless process variable transmitter for use in an industrial process control or monitoring system comprising:
a process variable sensor configured to sense a process variable of the industrial process;
a power source configured to power the process variable transmitter;
diagnostic circuitry configured to diagnose operation of the power source of the process variable transmitter and having a diagnostic output indicative of a condition of the power source;
wireless communication circuitry configured to transmit and receive information related to the sensed process variable and related to the diagnostic output over a wireless communication link;
wherein the power source includes a solar cell and wherein the diagnostic circuitry monitors a voltage output of the solar cell;
the power source includes a battery; and a MOSFET which couples the battery to the circuitry configured to prevent discharge of the battery.

41. A method for diagnosing a wireless process transmitter coupled to an industrial process comprising:

powering the wireless process transmitter with a power source which includes a solar cell;

diagnosing operation of the power source of the wireless process transmitter by monitoring a voltage output of the solar cell;

transmitting information related to a diagnoses of the power source of the wireless process transmitter over a wireless communication link;

the power source includes a battery; and providing an output related to a time period required to charge the battery.

42. A method for diagnosing a wireless process transmitter coupled to an industrial process comprising:

powering the wireless process transmitter with a power source which includes a solar cell;

diagnosing operation of the power source of the wireless process transmitter by monitoring a voltage output of the solar cell;

transmitting information related to a diagnoses of the power source of the wireless process transmitter over a wireless communication link;

the power source includes a battery; and providing an output related to battery temperature.

\* \* \* \* \*